(12) United States Patent
Siercks et al.

(10) Patent No.: US 8,294,906 B2
(45) Date of Patent: Oct. 23, 2012

(54) MEASURING HEAD SYSTEM FOR A COORDINATE MEASURING MACHINE AND METHOD FOR OPTICALLY MEASURING OF DISPLACEMENTS OF A PROBE ELEMENT

(75) Inventors: Knut Siercks, Moerschwil (CH); Heinz Lippuner, Rebstein (CH); Ursula Schwitter, Buchs (CH); Stefan Frei, Widnau (CH); Baptiste Wusk, Arbon (CH); Claus P. Keferstein, Werdenberg (CH)

(73) Assignee: Leica Geosystems AG, Heerbrugg (CH)

( * ) Notice: Subject to any disclaimer, the term of this patent is extended or adjusted under 35 U.S.C. 154(b) by 74 days.

(21) Appl. No.: 12/741,075

(22) PCT Filed: Oct. 29, 2008

(86) PCT No.: PCT/EP2008/064642
§ 371 (c)(1),
(2), (4) Date: Sep. 14, 2010

(87) PCT Pub. No.: WO2009/059916
PCT Pub. Date: May 14, 2009

(65) Prior Publication Data
US 2011/0013199 A1 Jan. 20, 2011

(30) Foreign Application Priority Data
Nov. 5, 2007 (EP) .................................. 07119973

(51) Int. Cl.
*G01B 11/14* (2006.01)
(52) U.S. Cl. ......................................... 356/615; 356/614

(58) Field of Classification Search .......... 356/614–615, 356/620, 622; 33/556, 558, 559, 560, 561, 33/557; 250/202, 206, 200, 215, 216, 224
See application file for complete search history.

(56) References Cited

U.S. PATENT DOCUMENTS

| | | | |
|---|---|---|---|
| 4,158,768 A | 6/1979 | Lavelli | |
| 5,048,194 A | 9/1991 | McMurtry | |

FOREIGN PATENT DOCUMENTS

| | | |
|---|---|---|
| DE | 27 41 413 A1 | 3/1978 |
| DE | 38 26 581 A1 | 2/1990 |
| DE | 44 09 360 A1 | 9/1994 |
| EP | 0 373 644 A1 | 6/1990 |
| GB | 2 150 282 A | 6/1985 |
| WO | 2005/085749 A1 | 9/2005 |

*Primary Examiner* — Tri T Ton
(74) *Attorney, Agent, or Firm* — Maschoff Gilmore & Israelsen

(57) ABSTRACT

A measuring head system for a coordinate measuring machine, having a scanning element for contacting a measured object as a contacting part, which can be moved such that an object to be measured can be mechanically scanned using the scanning element. An optical sensor is fixed on the measuring head base. Means are provided to generate a projection on the sensor line using at least one radiation source. The means have at least one first mask element to generate a first partial projection on the sensor line such that said partial projection is optimized to determine an x displacement and a y displacement of the contacting part in relation to the measuring head base in the x direction or y direction. An analysis unit is configured to determine the x displacement and the y displacement from signals only generated by the one sensor line.

27 Claims, 7 Drawing Sheets

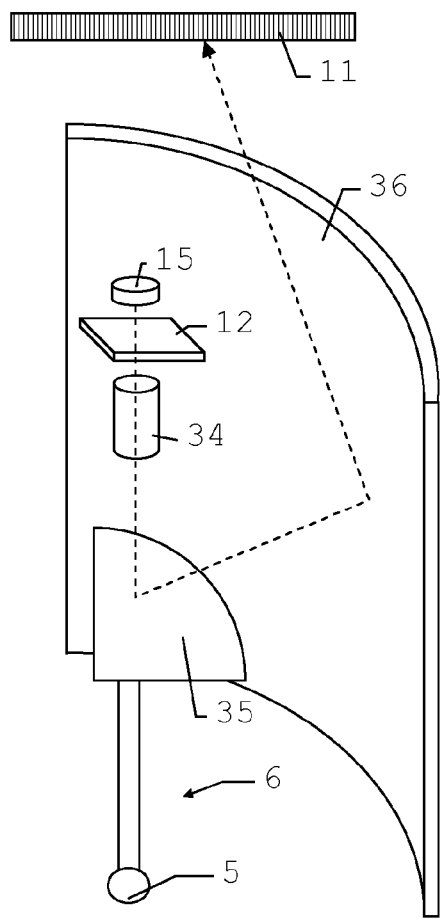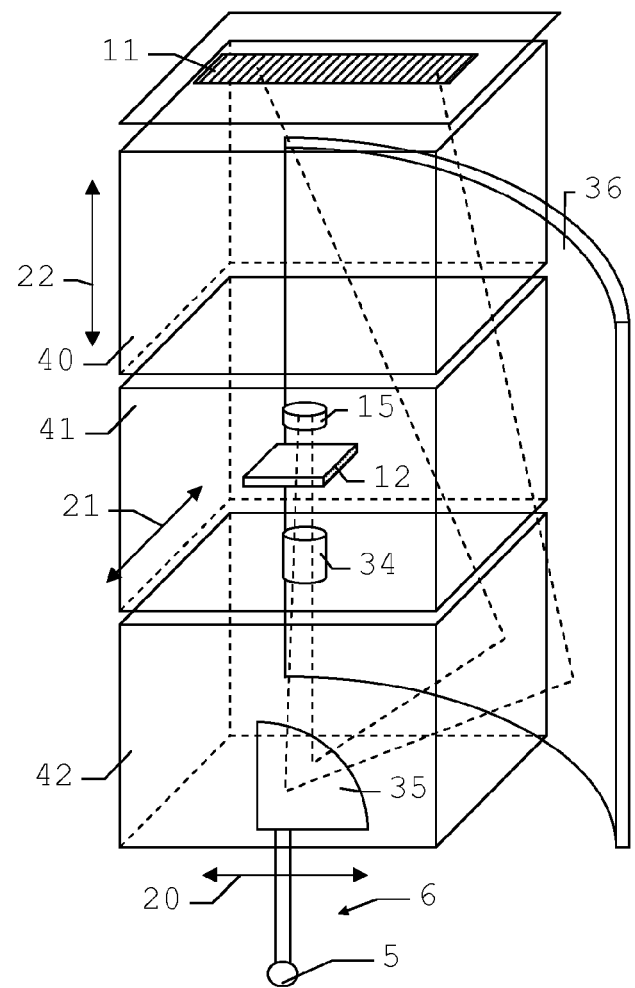
Fig. 8a
Fig. 8b

MEASURING HEAD SYSTEM FOR A COORDINATE MEASURING MACHINE AND METHOD FOR OPTICALLY MEASURING OF DISPLACEMENTS OF A PROBE ELEMENT

The invention relates to a measuring head system for a coordinate measuring machine comprising a mechanical scanning element and a method for optical measurement of displacements of a scanning element of the measuring head system.

BACKGROUND

Measuring head systems for coordinate measuring machines comprising a mechanical scanning element have been used for many years for exact surveying of the surface of a measured object. A measuring head system of the generic type, also referred to as scanning head, for a corresponding coordinate measuring device is disclosed, for example, in EP 0 373 644 A1.

For example, the object shape of mechanically produced workpieces is checked therewith for quality control. For the measuring process, the measuring head of the coordinate measuring device is brought towards the measured object by means of a displacement frame until a scanning element mounted so as to be displaceable relative to a measuring head base of the measuring head, in particular a stylus, touches a desired measuring point on the measured object. The spatial coordinates of the scanned measuring point can then be determined from the position of measuring head and the position of the scanning element relative to the measuring head base.

Various methods are known for determining the position of the stylus relative to the measuring head base, in other words the deflection of the stylus during scanning of the measured object.

In the case of the measuring head system from EP 0 373 644 A1 mentioned at the outset, an optical detector is used for this purpose. This comprises two light transmitters, which produce two light beams converging diagonally towards one another, and a two-dimensional PSD (position sensitive device) as a light receiver. When the stylus is in its undeflected rest position, the two light beams produce a common light spot in the centre of the PSD. If the stylus is deflected, the two light beams each produce a light spot on the PSD, the two light spots migrating on the PSD depending on the size and the direction of the deflection. Depending on the position of the light spots, the PSD produces two output currents, with the aid of which the position of the light spots on the PSD can be determined. From the values obtained, it is then possible to determine the magnitude and direction of the stylus deflection. Owing to the particular type of arrangement of the light transmitters, deflections of the stylus in all three coordinate directions (x, y, z) can be detected in this case.

Another measuring head with optical detection of the stylus deflections is disclosed in WO 00/60307. In this case too, a photosensitive detector element measuring in two dimensions is used. The exact method of evaluation is, however, not stated in this publication.

DE 38 26 581 A1 discloses a measuring head which measures in three dimensions and in which a first optical detector element is used for the deflections of the stylus in the x or y direction and a second, spatially separate, optical detector element is used for detecting deflections in the z direction.

DE 27 41 413 A1 furthermore discloses a measuring head which measures in two dimensions and in which the deflection of the stylus in the x and y directions is determined from the position of a light spot on a two-dimensional field of photocells. For this purpose, the detector field is divided into four quadrants and the position of the light spot in one or more of the quadrants is a measure of the deflection of the stylus.

The publication WO 2005/085749 discloses a measuring head comprising a stylus and its deflection in the lateral and vertical directions is read by producing a circular light image on at least two line sensors arranged spatially separately and offset relative to one another. The at least two, preferably four, line sensors forming a sensor cross are illuminated together and simultaneously by the one light figure. It is furthermore stated that line sensors are measuring elements for in each case only one dimension.

In the case of all measuring head systems described above and disclosed by the prior art, reading of planar sensors or a plurality of line sensors is absolutely essential, which proves to be very disadvantageous with regard to the speed of reading and hence also the speed of measurement.

In addition, there is a multiplicity of measuring heads in which the deflections of the stylus are detected not by an optical method but by other detectors, for example moving coils or hall elements.

The known measuring head systems each alone have individual strengths and weaknesses with regard to the maximum achievable accuracy of measurement, the maximum speed of measurement and the maximum possible measuring range and moreover with regard to size and weight of the measuring head, robustness and production cost. However, none of the known measuring head systems meets all requirements in the same way.

SUMMARY

Against this background, it is a general object of the present invention to provide an improved measuring head system comprising optical measuring components and an improved optical method of measurement for a coordinate measuring machine.

A specific object of the invention is the provision of a measuring head system and optoelectronic method of measurement which are improved with regard to the speed of reading and hence the speed of measurement.

A further specific object of the invention is provision of a measuring head system comprising fewer complex optical measuring components which in particular occupy less space and ensure the same or an improved accuracy of measurement.

These objects are achieved by realizing the characterizing features of the independent claims. Features which further develop the invention in an alternative or advantageous manner are described by the dependent patent claims.

A measuring head system according to the invention for a coordinate machine has a part which is provided for contacting a measured object, is present on a scanning element, is moveable in general relative to a measuring head base in a lateral x direction and a lateral y direction, and specifically additionally in a vertical z direction, and is therefore suitable for mechanical scanning of the measured object.

For this purpose, the measuring head system may have, in the manner already known, a plurality of movement sections by means of which the scanning element is connected to the measuring head base. The movement sections are connected to one another and to the measuring head base in such a way that a guided displacement in each case in the x, y and optionally z direction can be performed between in each case two movement sections or between measuring head base and the movement section mounted thereon. As a result, moveability of the scanning element, guided in these directions, relative to the measuring head base is ensured, with the result that the scanning element is freely moveable—except for rotational movements and up to a certain deflection from a zero position.

According to the invention, means comprising at least one radiation source and at least one first mask element for producing a first partial projection on a sensor line arranged on the measuring head base are used for exact optoelectronic measurement of displacements of the contacting part on the scanning element relative to the measuring head base. The first mask element is formed in such a way that the first partial projection is optimized for determining lateral displacements of the contacting part of the scanning element in the x and y directions.

From the signals generated only by the one sensor line, the evaluation unit can accordingly determine the x and y displacements.

For the additional determination of a displacement of the contacting part in a vertical z direction, the means may furthermore have a second mask element differing from the first mask element. The second mask element is formed for producing a second partial projection on the sensor line in such a way that the second partial projection is optimized for determining at least one z displacement in the z direction of the contacting part relative to the measuring head base.

In this case, the evaluation unit is formed for determining the x, the y and z displacements from signals generated only by the one sensor line.

The sensor line as part of an optical sensor consists of a multiplicity of sensor elements arranged in series so that the projection produced thereon—comprising first and optionally second partial projections—is readable. The optical sensor is preferably a line sensor having a single sensor line since a single line can be read considerably more quickly than a plurality of lines or even planar sensors. For example, as is known according to the prior art—CCD line arrays or line sensors in CMOS technology are suitable for this purpose. However, planar, two-dimensional sensors in which only a single line is read for measuring the displacements can alternatively also be used. The sensor is preferably mounted on the measuring head base so that the sensor line—or, more exactly, the longitudinal axis of the sensor line—is oriented in the x direction. The longitudinal axis of the sensor line is defined as that axis which is parallel to the direction of arrangement in series of the individual sensor elements.

Furthermore, sensor line is to be understood as meaning a continuous, substantially uninterrupted arrangement of sensor elements in series so that a cohesive line forms the line which in particular is straight. It is true that the individual linearly arranged sensor elements can be arranged side by side with the minimum spacing. Functionally, the sensor line forms a continuous line such that a continuous section of the projection can be detected and hence the course of the projection produced on the sensor line can be evaluated without interruption. The x and y displacements—and optionally also the z displacement—are determined from the single cohesive linear section read.

The means for producing the projection, i.e. the at least one radiation source and the mask elements, are preferably spatially connected in a fixed manner to the scanning head so that they perform all displacements of the scanning head together with the scanning head and hence the projection produced on the sensor line depends on the position of the scanning head relative to the measuring head base. In particular, however, a mask element together with the radiation source illuminating it can also be mounted on a movement section of the measuring head system, which movement section is moveable in only one direction or in only two of the three directions. This mask element then permits in particular only the determination of deflections of the scanning head in the one or the two directions. For example, this can be consciously used for eliminating a danger of confusing different changes of the partial projections, which changes are caused by the respective displacements in the three directions, which will be discussed in more detail below.

According to the invention, the at least two different partial projections can be separated from one another with respect to space or time so that they may differ from one another in the reading of the sensor line. For example, the two partial projections can be projected side by side onto in each case half the sensor line or alternatively are produced in an alternating manner on the same sensor line or an identical region thereof. Moreover, the partial projections can also be produced separately from one another with respect to space and time on the sensor line.

Interlaced focusing of the two partial projections on the sensor line is also possible so that the two partial projections differ, for example, in terms of the pattern produced on the sensor line and hence can be evaluated separately for determining the lateral or vertical displacement.

As already mentioned above, a measuring head system improved with regard to the speed of reading can be provided by the production, according to the invention, of two partial projections on only a single sensor line and reading of the single sensor line, it nevertheless being possible to determine displacements in all three directions in which the contacting part of the scanning element is moveable, with the same or even improved accuracy of measurement. This is achieved by producing partial projections which are designed for determining specifically the lateral displacements or specifically the vertical displacement.

The first partial projection which is optimized for determining lateral displacements and is produced by the first mask element has a pattern such that both an x displacement and a y displacement can in each case be unambiguously identified and read. The first partial projection is therefore designed for determining lateral displacements in that, even in the case of a deflection of the contacting part along all three directions, changes in the first partial projection on the sensor line can be unmistakably recognized as a change due to the x displacement or as a change due to the y displacement.

The first mask element can be formed in particular in such a way that the x displacement of the contacting element of the scanning element produces a defined movement of the first partial projection along the sensor line. Thus, it is possible to determine an extent of the x displacement on the basis of a displacement of the entire first partial projection along the sensor line. In addition, the y displacement is determined from the first partial projection produced by the first mask element. For this purpose, the mask element is additionally formed, for example, so that a y displacement results in a defined proportionality change of the first partial projection produced on the sensor line. The proportionality change is to be understood as meaning a defined change in the proportionalities of the pattern produced on the line.

Three light spots produced on the line by the partial projection can be used as a simple example, a distance a being defined by the distance from first to second light spot and a distance b being defined by the distance from first to third spot. In the case of a y displacement, the first partial projection produced on the sensor line—i.e. the arrangement of the light spots on the sensor line—changes in such a way that, depending on the extent of the y displacement, the ratio of the distance a to the distance b changes in a defined manner. Such a proportionality change can now be unambiguously identified as a change of the first partial projection caused by the y displacement. In a further embodiment, however, it is also possible to use only a defined change in the distance a for determining the extent of the y displacement.

For example, the first mask element can be specifically formed for producing the first partial projection designed for determining lateral displacements, in such a way that the first partial projection has a pattern comprising two lines oriented perpendicularly to the sensor line and a third line oriented obliquely relative to the sensor line. Likewise, the first partial projection may also have, for example, a V-shaped structure.

The optimization of the second partial projection produced by the second mask element for determining the vertical displacements is effected, with regard to unambiguous identifiability and exact readability, by changes of the second partial projection which are produced by the z displacement. The second partial projection is designed for determining the vertical displacement in that, even in the case of a deflection of the contacting part along all three directions, a specific change in the second partial projection on the sensor line is unmistakably recognizable as a change produced and defined by the z displacement.

The second mask element is formed in particular in such a way that the z displacement of the contacting part produces a defined scaling change of the second partial projection on the sensor line. Scaling change is to be understood as meaning an increase or a decrease in the size of the total second partial projection, i.e. all ratios within the partial projection or the partial projection pattern on the sensor line remain unchanged whereas the size scale of the total second partial projection is changed.

For example, the second mask element can be specifically formed for this purpose such that the second partial projection has a pattern comprising a plurality of lines which are oriented perpendicular to the sensor line and are arranged side by side.

Since an x displacement produces in the first partial projection a change which is more exactly resolvable than a y displacement, the x displacement can also be determined with higher accuracy. In order nevertheless to be able to determine y displacements with the required accuracies, the second partial projection can additionally be optimized, for example, for determining the y displacement, so that a y displacement determined from first and second partial projections can be averaged and hence determined more accurately. For this purpose, the second mask element is formed in such a way that the y displacement additionally produces a defined proportionality change in the second partial projection on the sensor line, and the y displacement is also unambiguously identified on the basis of this proportionality change in the second partial projection.

For producing the second partial projection, in particular the second mask element and the radiation source illuminating it can be mounted in a spatially fixed manner on that movement section of the measuring head system which is moveable relative to the measuring head base only in the y and z directions. Thus, changes in the second partial projection which are produced by deflections of the contacting part on the scanning element in the x direction can be ruled out from the outset, with the result that a danger of confusion with the changes actually to be measured, which are produced by displacements in the y or z direction, disappears.

The at least two mask elements can be realized, for example, on a common mask, in particular if the at least two partial projections are realized in such a way that they are interlaced.

Alternatively, the mask elements can also be realized in each case on a separate mask, in which case a plurality of radiation sources or direction-changing means are used for illuminating the masks.

Mask elements which may be used are those means which are known according to the prior art and are suitable for producing the partial projections described above. For example, the mask elements may have for this purpose opaque and transparent regions, with the result that a shadow projection can be produced as a simple example of a partial projection.

As is known from the prior art, one or more additional optical systems can be arranged for producing the partial projections on the sensor line, it being possible to use all known types of optical systems, such as diffractive, refractive or reflective ones. In particular, a microscope objective-like lens combination is arranged in the beam path after the mask elements, for example for sharp and/or magnified projection of the mask element pattern on the sensor line. For less complicated assembly, fixed mounting of this lens combination on the measuring head base, i.e. on the non-moveable part of the measuring head system, may be advantageous, mounting on the scanning element—downstream of the mask elements—also being possible as an alternative.

Furthermore, all interpolation methods known to the person skilled in the art can be used when reading the sensor line.

A measuring head system according to the invention is suitable in particular for coordinate measuring machines in which the measuring head system is mounted on moveable arms or on a displacement frame of the coordinate measuring machine, and means for determining a relative spatial position of the measuring head system with respect to an internal coordinate system are present.

BRIEF DESCRIPTION OF THE DRAWINGS

The invention is described in more detail below, purely by way of example, with reference to working examples shown schematically in the drawings, further advantages also being discussed. Specifically.

FIG. 8a-b schematically show a further working example for producing the partial projections on the sensor line.

DETAILED DESCRIPTION

Figure 1:
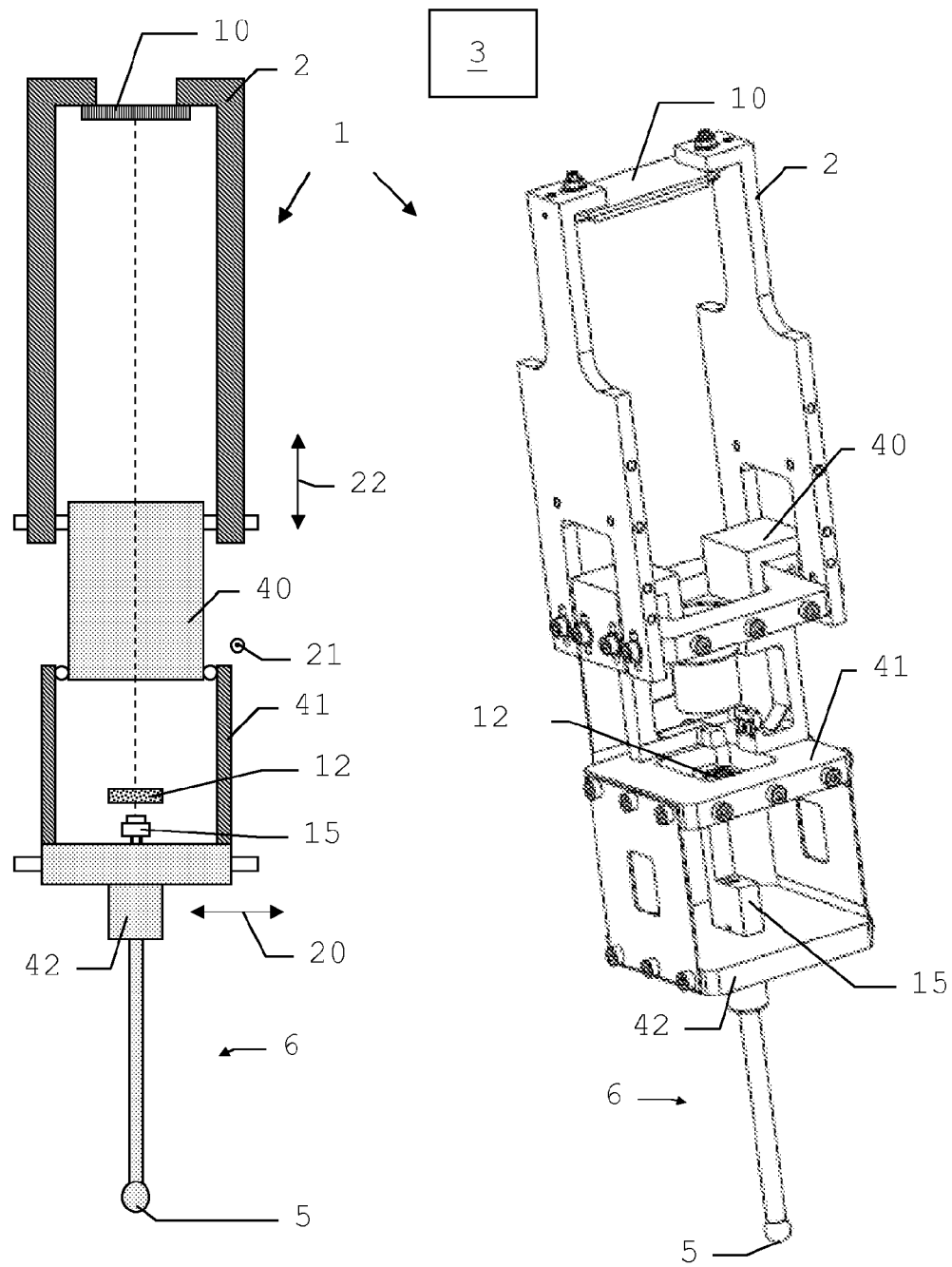
FIG. 1 shows a working example of a measuring head system according to the invention for a coordinate measuring machine.

FIG. 1 shows a measuring head system 1 for a coordinate measuring machine in a schematic sectional diagram and a three-dimensional oblique view. The structure of measuring head systems of the generic type comprising a scanning element is already known from the prior art. The contacting part 5 of a scanning element 6 in the form of a stylus and intended for scanning a measured object is moveable in three spatial directions 20, 21, 22 perpendicular to one another, relative to a measuring head base 2 which is mounted in a fixed manner, for example, on an arm of a coordinate measuring machine. For this purpose, the scanning element 6 is suspended from the scanning head base 2 via three movement sections 40, 41, 42 which are shown schematically here and permit a guided movement in one spatial direction 20, 21, 22 in each case.

As indicated by the arrows 20 or 21, 22 as an illustration of the guaranteed freedom of movement, a guided movement in the z direction 22 is permitted, for example, by the suspension of the first movement section 40 from the measuring head base, a guided movement in the y direction 21 is permitted by the suspension of the second movement section 41 from the first movement section, and a guided movement in the x direction 20 is permitted by the suspension of the third movement section from the second movement section. The scanning element 6 is mounted in a fixed manner on the third movement section 42 or itself represents the third movement section 42, with the result that the measuring head system 1 shown schematically here is now capable of executing displacements or deflections in all three spatial directions x, y, z.

However, the method of suspension plays only a minor role for realizing the present invention. The suspensions can be realized, for example, by spring suspensions (diaphragm springs, spring parallelograms, double spring parallelograms) or linear guides (sliding bearings, roller bearings or the like), as is known to the relevant persons skilled in the art. The measuring head base 2 may be, for example, the housing of the measuring head system 1 or a part connected to it.

An optical sensor 10 having a readable sensor line comprising a multiplicity of sensor elements arranged in series is fixed to the measuring head base 2. The longitudinal axis of the sensor line is oriented parallel to the x direction 20.

Means for producing a projection on the sensor line which is dependent on displacements of the contacting part 5 of the scanning element 6 relative to the measuring head base 2 are arranged in a spatially fixed manner relative to the scanning element 6. For this purpose, the means have a radiation source 15, for example an LED or a laser diode, and a mask 12 arranged downstream of the radiation source 15. According to the invention, the mask 12 has a first mask element and a second mask element which differs therefrom and is formed for producing at least one first or one second partial projection on the sensor line such that the first partial projection is optimized for determining a x and a y displacement in the x and y direction 20, 21, respectively, and the second partial projection is optimized for determining at least one z displacement in the z direction 22 of the contacting part 5 relative to the measuring head base 2.

The measuring head system 1 has an evaluation unit 3 for determining the x, the y and the z displacement from signals produced only by the one sensor line. In other words, the displacements of the scanning element 6 or of the contacting part 5 can now be determined in each case in the three spatial directions x, y, z by reading only the single sensor line, with the result that, according to the invention, advantages can be achieved with regard to the speed of reading and hence the speed of measurement. Since at least two differing and in each case specially optimized mask elements are used, the deflections of the scanning element 6 can be determined in spite of the enormously fast speed of reading with generically required accuracies or even accuracies improved compared with the prior art.

Figures 2A, 2B:
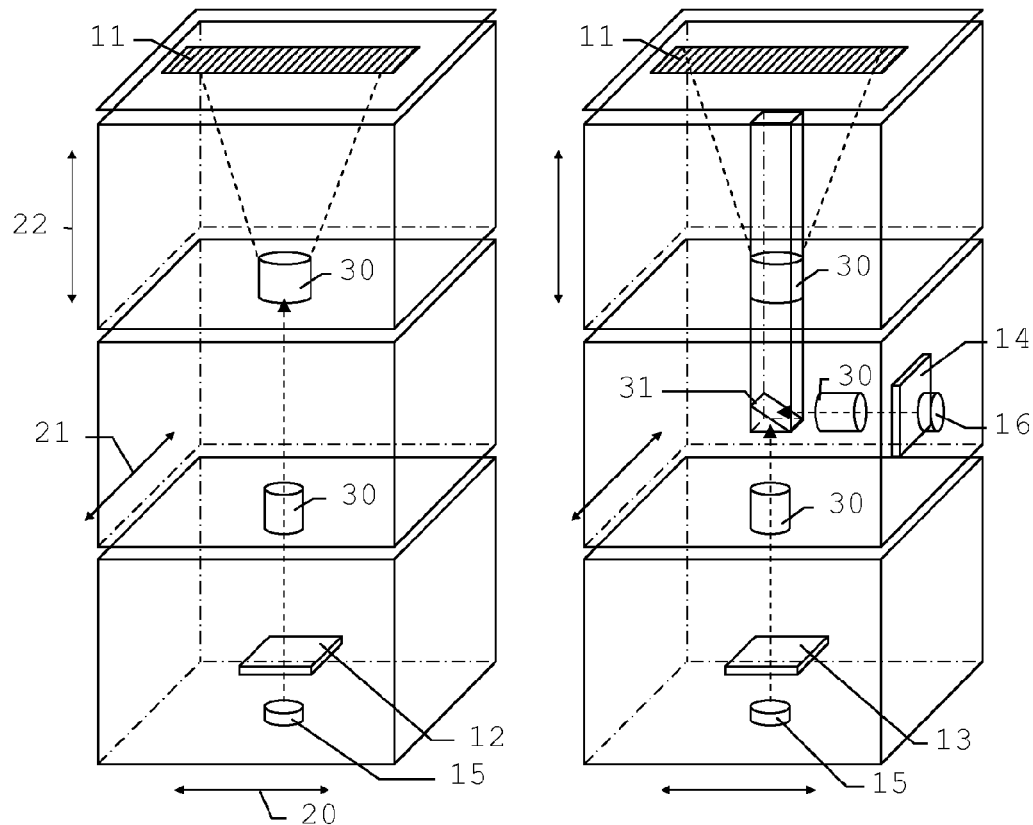
FIG. 2a-b show a schematic diagram of two working examples of a measuring head system according to the invention.

FIG. 2a schematically shows a measuring head system 1 according to the invention, comprising three moving parts which are shown as cuboids and which—according to the description for FIG. 1—permit the guided displacements in each case in a spatial direction 20, 21, 22.

A scanning element not shown here for the sake of simplicity is fixed to the lowermost moving part. Likewise, a radiation source 15 with a downstream mask 12, which are formed for producing the two partial projections dependent on the relative position of the scanning element, is mounted thereon. A microscope objective-like lens combination 30 is arranged in the beam path after the mask 12, which has two mask elements, for sharp and magnified projection of the mask element pattern on the sensor line 11. This lens combination 30 is mounted in a fixed manner on the measuring head base.

FIG. 2b shows a working example with the means for producing the partial projections arranged in an alternative manner compared with FIG. 2a.

A first radiation source 15 and the downstream mask 13 with a first mask element are mounted in a fixed manner on the third movement section. The third movement section is—according to the description for FIG. 1—moveable relative to the measuring head base in all three spatial directions x, y, z. The first mask element is optimized in such a way that the first partial projection produced thereby is designed for determining an x and a y displacement. For this purpose, the mask element has a pattern so that in each case a x and a y displacement can be unmistakably identified, in each case separately, from the first partial projection produced on the sensor line 11, and the extents of these displacements can be read.

A second radiation source 16 and a downstream further mask 14 with a second mask element are mounted in a fixed manner on the second movement section, which is moveable relative to the measuring head base only in the y and z directions. If the contacting part of the scanning element is now deflected in all three spatial directions x, y, z, the second movement section nevertheless executes only the deflections in the y and z directions. The second partial projection produced by the second radiation source 16 and the second mask element therefore does not change in the case of a pure x deflection of the contacting part. The second mask element is therefore specifically formed in such a way that the second partial projection is optimized for determining the y and z displacement. Confusion of a change in the second partial projection on the sensor line, caused by an x displacement, with a change caused by a y or z displacement can therefore be ruled out from the outset.

In this working example, the first and the second partial projections are produced chronologically separately and alternately on the sensor line 11. For example, the two partial projections can be distinguished and identified in each case on reading on the basis of a defined alternating rhythm. For this purpose, a prism 31 for combining the beam paths of the first and the second partial projections is arranged before or between a sharply focussing lens combination 30.

Since both the first and the second partial projection are designed for reading the y displacement, for example, a mean value of the y displacement values determined from the first or the second partial projection can be calculated for determining the y displacement.

Figure 3:
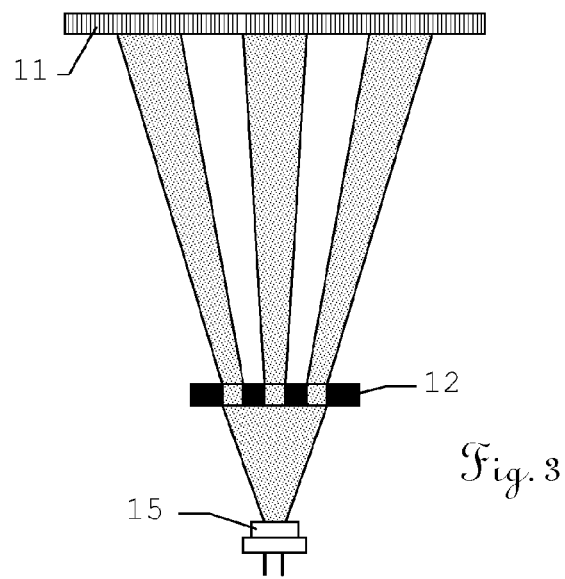
FIG. 3 schematically shows a working example for producing a shadow-casting projection on the sensor line.

FIG. 3 schematically illustrates a known and suitable example for producing a readable projection on the sensor line 11. For this purpose, according to the shadow-casting principle, a mask 12 having transparent and opaque regions forming a pattern is illuminated by a radiation source 15 and thus projects a part of the cast shadow formed by the pattern onto the sensor line 11.

Depending on the position of the detector relative to the radiation source 15 and mask 12, a corresponding part of the cast shadow is projected on the sensor line 11, from which the instantaneous relative position can be inferred.

FIGS. 4a to 4d show working examples for the mask elements 17, 18 optimized in each case for determining either lateral or vertical displacements. In each case mounting of the sensor line parallel to the x direction 20 is envisaged.

Figure 4A:
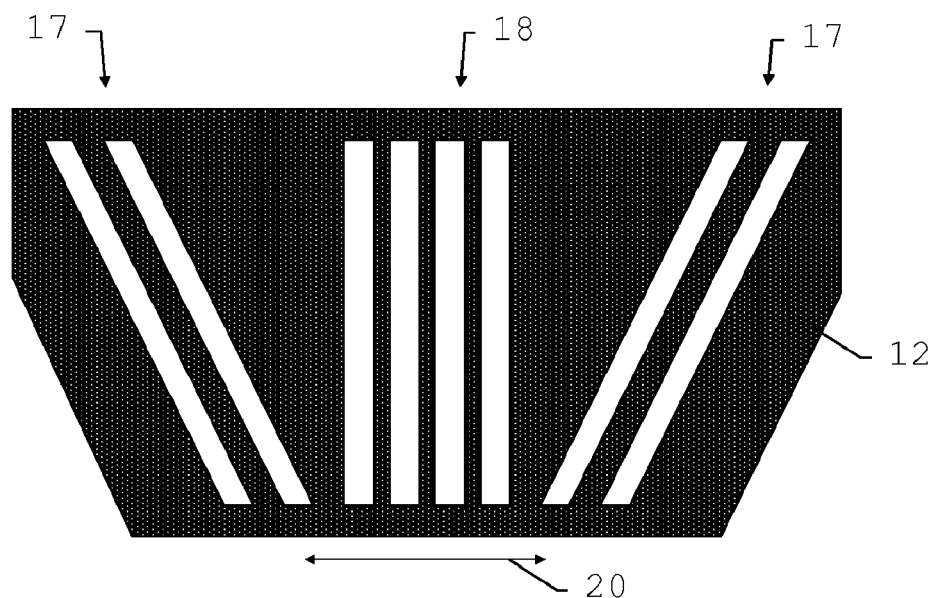
FIG. 4a-d show working examples for the first and the second mask element in each case.
Figure 5:
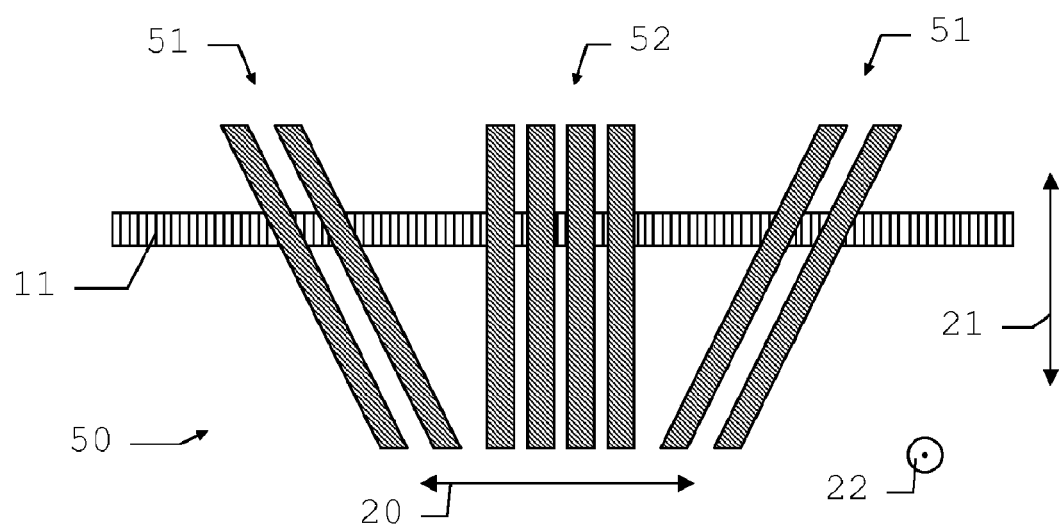
FIG. 5 shows a projection produced by the mask shown in FIG. 4a and comprising two interlaced partial projections on the sensor line.

In FIG. 4a, the first and the second mask elements 17, 18 are realized on a common mask 12 which can be illuminated by a radiation source. The first mask element 17 has a pattern of in each case two lines parallel to one another and oriented obliquely to the x direction 20 and hence a certain V-shape, whereas the second mask element 18 has four lines parallel to one another and arranged perpendicular to the x direction 20. The first and second partial projections are produced by this mask 12, i.e. in an interlacing manner. FIG. 5 shows a projection 50 produced by the mask 12 shown here onto the sensor line 11. As can be seen, the projection 50 gives rise to eight light spots on the sensor line 11, the two outer left and the two outer right light spots forming as a result of the first partial projection 51 and the four inner light spots forming as a result of the second partial projection 52.

If the illuminated mask moves in the z direction 22, the extent of this displacement can be determined unambiguously and without confusion with displacements in other directions from the respective distances of the four light spots of the second mask element which are produced by the parallel lines. The second mask element is therefore optimized for determining the z displacement.

A displacement of the mask in the x direction 20 results in displacement of the projection 50 along the sensor line 11, which can be unambiguously determined, for example, from the position of a midpoint of the distance from outermost left to outermost right light spot. The determination of the y displacement can be effected, for example, unambiguously and unmistakably on the basis of a defined ratio of the distance or of the spacing from outermost left to outermost right light spot relative to the spacing of the two outer left light spots. The first mask element by means of which the two outer left and two outer right light spots are produced is therefore optimized for determining lateral displacements.

If it is intended to read only x and y displacements from the projection 50 produced on the line, a spacing from the centroid of the two left or right light spots to the overall centroid of the light figure 50 can also be used for determining the y displacement.

In particular, it is also possible to use further disposition features of the light spots produced on the sensor line 11, which are characterized by a combination of the light spots produced by first and second mask element, for determining the displacements.

Figure 4B:
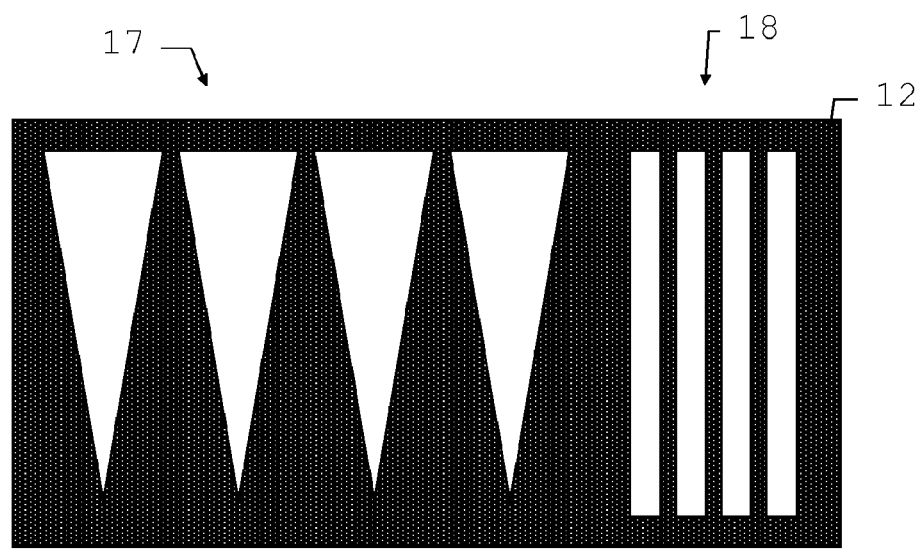

FIG. 4b illustrates a further example for a first and a second mask element 17, 18, which are now realized side by side on a common mask 12.

The first mask element 17 has four triangles arranged side by side and hence once again a certain V-shape. The position of the midpoint of the intensity of the illumination zones formed by the triangles on the sensor line can be used unambiguously for determining the x displacement, and the ratio of the width of the illumination zones to the spacing of the illumination zones can be used for determining the y displacement unambiguously and independently of displacements in the x and z direction. The first mask element 17 is therefore optimized for determining lateral displacements.

The second mask element 18 is formed according to the embodiment in FIG. 4a and hence designed for determining z displacements.

The two partial projections produced by the mask elements 17, 18 are now projected spatially separately, namely side by side, on the sensor line. Thus, these partial projections are read separately and in a manner distinguishable from one another.

Figure 4C:
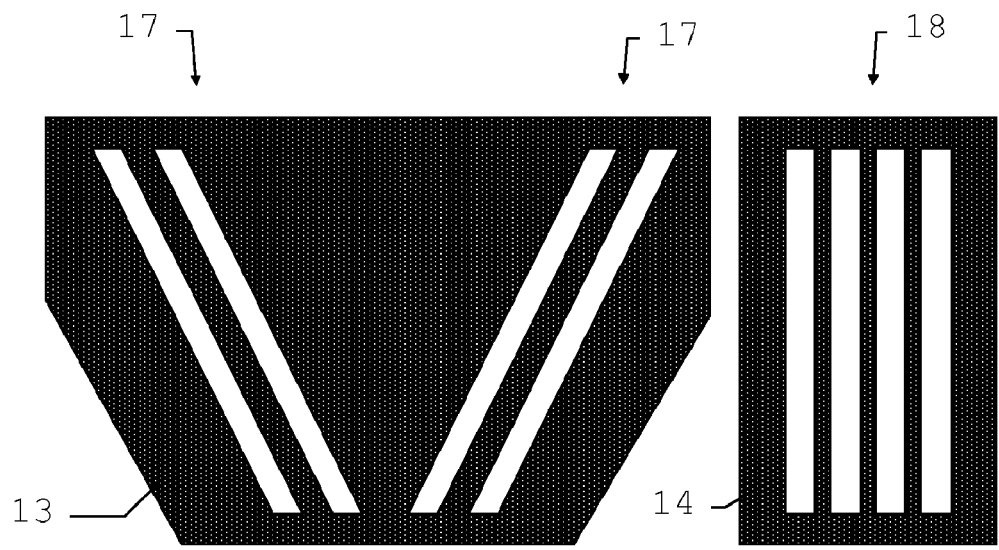

In FIG. 4c, the two mask elements 17, 18 corresponding to FIG. 4a are realized on two separate masks 13, 14. The separate masks 13, 14 can now—as shown, for example, in FIG. 2b, 6a or 6b—be illuminated by two separate sources and their partial projections combined either side by side, one inside the other or with a time lag and projected on the sensor line.

Figure 4D:
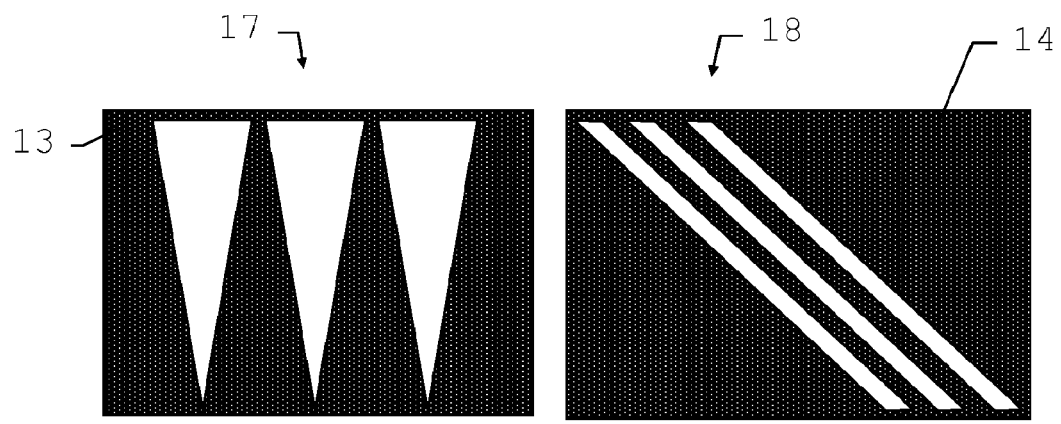

In FIG. 4d, the two mask elements 17, 18 formed similarly to FIG. 4c are realized on two separate masks 13, 14. In particular, the second mask element 18 is intended for mounting on a movement section which executes only y and z displacements with the scanning element together, which corresponds, for example, to the embodiment from FIG. 2b. Since a change in the second partial projection produced by the second mask element 18 which results in a x displacement can therefore be ruled out from the outset, it is possible in this embodiment of the second mask element 18 to determine a y displacement on the basis of a movement of the second partial projection along the sensor line with high resolution. As in the past, z displacements can also be determined on the basis of scaling changes of the second partial projection 18 on the sensor line.

The second mask element 18 shown in this working example is therefore optimized for determining the z and the y displacement.

Since the first mask element 17, as already mentioned in the description for FIG. 4b, is optimized for determining lateral displacements, averaging of y displacement values determined on the basis of the first partial projection and of the y displacements determined on the basis of the second partial projection can be effected and hence a y displacement can be determined more accurately.

Figures 6A, 6B:
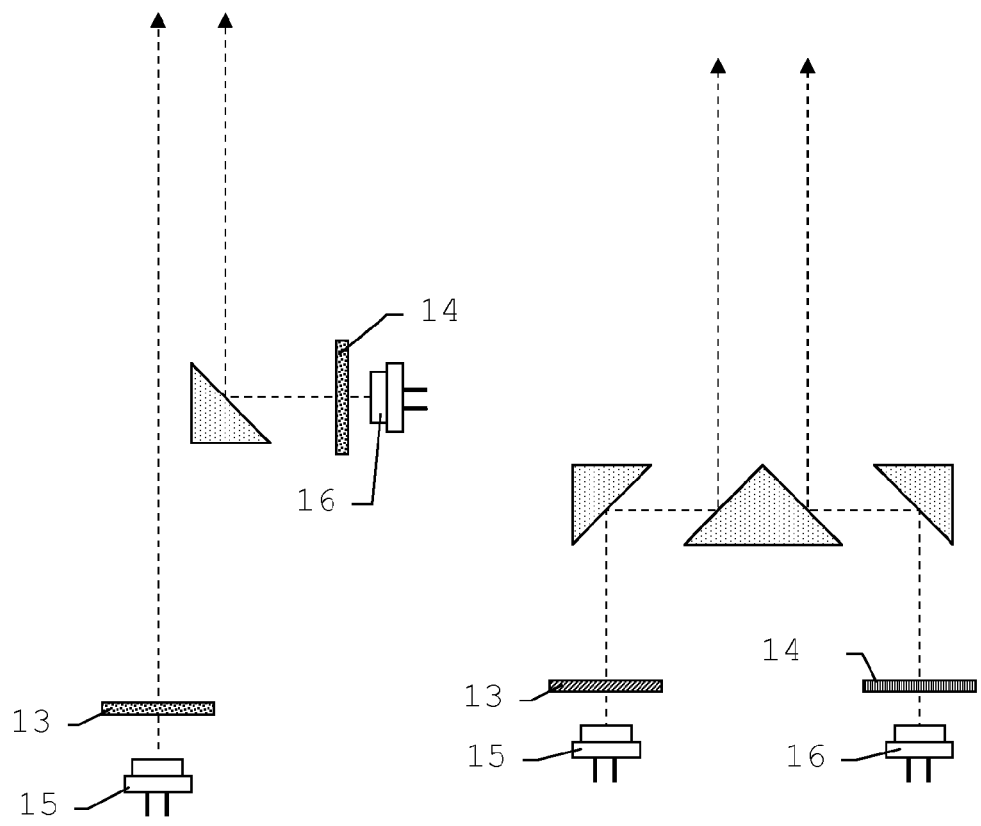
FIG. 6a-b schematically show further working examples for producing the partial projections.

FIGS. 6a and 6b show two working examples for side-by-side combination of the first and second partial projections produced by two separate masks 13, 14.

FIG. 6a shows an example which is an alternative to FIG. 2b. The two partial projections are now not chronologically separated but combined side by side so that they are projected side by side on one sensor line.

FIG. 6b shows an example of combination of partial projections located side by side and produced by two mask elements realized on separate masks 13, 14, both radiation sources 15, 16 and masks 13, 14 being mounted in a fixed manner on the scanning element. As a result, deflections of the contacting part on the scanning element result in each case in a change in both partial projections in each spatial direction x, y, z.

Figure 7:
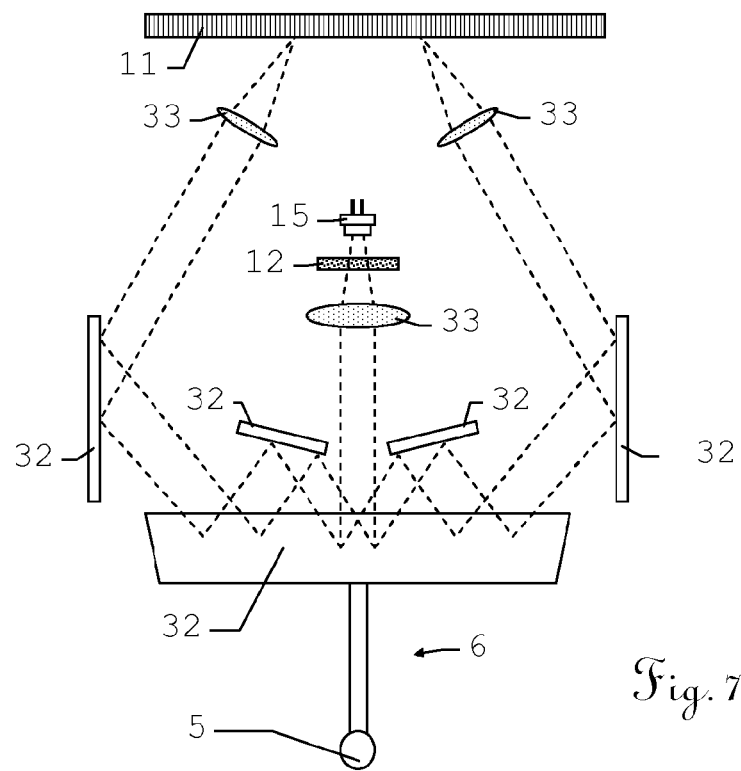
FIG. 7 schematically shows a further working example for producing the partial projections on the sensor line.

FIG. 7 shows a working example in which the partial projections produced by the radiation source 15 and the mask 12 having a first and a second mask element are magnified via reflective elements 32 and focused by additional lenses 33 sharply on the sensor line 11.

In particular, the scanning element 6 in the form of a stylus may also be suspended in a tiltable manner relative to the measuring head base so that the scanning element 6 is tilted during scanning of a measured object. As a result of such tilting, the contacting part 5, i.e. that part of the scanning element 6 which touches the measured object, nevertheless experiences translational displacements in an x, a y or a z direction. According to the invention, a first and second partial projection can now be produced on the sensor line so that changes in the two partial projections produced on the sensor line which are caused by tilting of the scanning element 6 are now also read in such a way that the x, the y and the z displacement of the contacting part 5 relative to the measuring head base are determined therefrom.

FIGS. 8a and 8b show—for a more comprehensible presentation firstly without and secondly with movement sections 40, 41, 42 of the measuring head system 1—a further working example for producing the partial projections on the sensor line 11. This variant envisages that the radiation source 15 emits light in the negative z direction 22 to a parabolic mirror 35. This is fixed on the scanning element 6 and therefore concomitantly executes all scanning element deflections. The mask 12 having, according to the invention, two different mask elements and a magnifying optical system 34 are present in the beam path. The light beam is now reflected by the mirror surface of the paraboloid 35 and deflected to the side. In order to project the image onto the sensor line 11, a hollow cylindrical mirror 36 is arranged outside the movement sections 40, 41, 42 so that the partial projections are projected on the sensor line 11.

In this setup, the radiation source 15, the magnifying optical system 34, the mask 12 and the hollow cylindrical mirror 36 are now mounted in a fixed manner on the measuring head base. Only the parabolic mirror 35 is arranged on the scanning element 6 for concomitant execution of movements thereof or of the movements of the contacting part 5 of the scanning element 6.

In particular, the movement sections are at least half transparent so that the beam path of the partial projections is not interrupted or adversely influenced by the movement sections 40, 41, 42.

Of course, these figures shown schematically show only examples of possible embodiments. In the diagrams, further electronic control and supply parts and assembly components were not shown merely for reasons of clarity.

We claim:

1. A measuring head system for a coordinate measuring machine comprising:
    a scanning element having a part for contacting a measured object and including a contacting part, wherein the contacting part is moveable relative to a fixed measuring head base in a lateral x direction and a lateral y direction so that an object to be surveyed can be mechanically scanned with the scanning element;
    an optical sensor fixed on the measuring head base and having a readable sensor line including a multiplicity of sensor elements arranged continuously and substantially without interruption in series;
    means including at least one radiation source which are arranged for producing a projection that is dependent on displacements of the contacting part relative to the measuring head base on the sensor line, wherein the means further include a first mask element which is configured for producing a first partial projection on the sensor line in such a way that the first partial projection is optimized for determining an x and a y displacement in the x and y direction, respectively, of the contacting part relative to the measuring head base; and
    an evaluation unit, wherein the evaluation unit is configured for determining the x and the y displacement from signals generated only by one sensor line.

2. A measuring head system according to claim 1, wherein the means are arranged in a spatially fixed manner relative to the contacting part.

3. A measuring head system according to claim 1, the contacting part being moveable relative to the fixed measuring head base and in a vertical z direction, wherein:
    the means have a second mask element differing from the first mask element, which are formed, for producing a second partial projection on the sensor line, in such a way that the second partial projection is optimized for determining at least one z displacement in the z direction of the contacting part relative to the measuring head base, and
    the evaluation unit is configured for determining the x, y and z displacement from signals generated only by one sensor line.

4. A measuring head system according to claim 3, wherein the second mask element is configured such that the z displacement results in a defined scaling change of the second partial projection on the sensor line.

5. A measuring head system according to claim 3, wherein the second mask element is configured such that:
    the z displacement results in a defined scaling change of the second partial projection on the sensor line and the y displacement results in a defined proportionality change of the second partial projection on the sensor line or a defined movement of the second partial projection along the sensor line, wherein the second mask element has a pattern with lines arranged parallel and obliquely to the longitudinal axis of the sensor line.

6. A measuring head system according to claim 3, wherein the first and second mask elements are disposed on a common mask.

7. A measuring head system according to claim 3, wherein:
    the first and second mask elements are each disposed on a separate mask; and
    a plurality of radiation sources or direction-changing means are included for illuminating the masks.

8. A measuring head system according to claim 3, wherein the at least two partial projections are produced:
    in each case spatially separated from one another side by side on the sensor line, or
    in each case chronologically separately from one another alternately with a defined frequency on the sensor line, or
    in an interlaced manner on the sensor line.

9. A measuring head system according to claim 3, wherein the measuring head system includes three movement sections:
    a guided movement in the z direction being executable by suspension of a first movement section from the measuring head base;
    a guided movement in the y direction being executable by suspension of a second movement section from the first movement section; and
    a guided movement in the x direction being executable by suspension of a third movement section configured as scanning element from the second movement section.

10. A measuring head system according to claim 9, wherein the second mask element and a radiation source coordinated with the second mask element are mounted in a fixed manner on the second movement section.

11. A measuring head system according to claim 1, wherein:
    the sensor includes a line sensor having the single sensor line; and
    the longitudinal axis of the sensor line is oriented parallel to the x direction.

12. A measuring head system according to claim 1, wherein the first mask element is formed in such a way that:

the x displacement results in a defined movement of the first partial projection along the sensor line; and the y displacement results in a defined proportionality change of the first partial projection on the sensor line.

13. A measuring head system according to claim 1, wherein the first mask has a V-shaped pattern.

14. A measuring head system according to claim 1, wherein the projection is produced by shadow casting.

15. A measuring head system according to claim 1, further comprising one or more optical elements for producing the projection on the sensor line, which elements are diffractive, refractive or reflective.

16. A measuring head system according to claim 1, further comprising one or more optical elements for producing the projection on the sensor line, which elements are a magnifying or focusing, microscope objective lens combination for producing the projection on the sensor line.

17. A coordinate measuring machine comprising:
a measuring head system according to claim 1, the measuring head system being mounted on an articulated arm or a displacement frame of the coordinate measuring machine; and
means for determining a relative spatial position of the measuring head system.

18. A method for optoelectronic measurement of displacements of the part intended for contacting the measured object and including the contacting part of the scanning element of the measuring head system according to claim 1, for the coordinate measuring machine, the contacting part being moveable at least in a lateral x direction and a lateral y direction so that an object to be surveyed can be mechanically scanned with the scanning element, comprising the steps:
by the first mask element, producing a projection dependent on displacements of the contacting part relative to the measuring head base on a continuous and substantially uninterrupted line, wherein the projection includes at least one first partial projection on the sensor line which is optimized for determining the x and the y displacement in the x and y directions, respectively, of the contacting part relative to the measuring head base;
reading the line, wherein the determination is effected by reading only the one line; and
determining the x and the y displacement of the contacting part relative to the measuring head base in the x and the y direction, respectively.

19. A method according to claim 18, wherein the continuous and substantially interrupted line is a straight line.

20. A method according to claim 18, the contacting part additionally being moveable in a vertical z direction, wherein:
the projection additionally includes a second partial projection which differs from the first partial projection and is optimized for determining at least a z displacement of the contacting part relative to the measuring head base in the z direction; and
the determination of the x, y and z displacement is effected by reading only the one line.

21. A method according to claim 20, wherein the second partial projection is produced in such a way that:
the z displacement results in a defined scaling change of the second partial projection on the line.

22. A method according to claim 20, wherein the second partial projection is produced in such a way that:
the z displacement results in a defined scaling change of the second partial projection on the line and the y displacement:
results in a defined proportionality change of the second partial projection on the line; or
a defined movement of the second partial projection along the line; or
the second partial projection has a pattern comprising bars arranged parallel, side by side, equidistant and obliquely to the line read.

23. A method according to claim 20, wherein the production of the first and of the second partial projection is effected:
spatially separately from one another; or
at separate times from one another.

24. A method according to claim 20, wherein the production of the first and of the second partial projection is effected:
spatially separately from one another side by side, or
with a defined frequency or in an interlaced manner.

25. A method according to claim 18, wherein the first partial projection is produced in such a way that:
the x displacement results in a defined movement of the first partial projection along the line; and
the y displacement results in a defined proportionality change of the first partial projection on the line.

26. A method according to claim 18, wherein the first partial projection has a V-shaped pattern.

27. A method for optoelectronic measurement of displacements of the part intended for contacting the measured object and including the contacting part of the scanning element of the measuring head system according to claim 1 for the coordinate measuring machine, the contacting part being moveable at least in a lateral x direction and a lateral y direction so that an object to be surveyed can be mechanically scanned with the scanning element, comprising the steps:
producing the projection dependent on displacements of the contacting part relative to the measuring head base on a continuous and substantially uninterrupted line, wherein the projection includes at least one first partial projection which is optimized for determining the x and the y displacement in the x and y direction, respectively, of the contacting part relative to the measuring head base;
reading the line, wherein the determination is effected by reading only the one line; and
determining an x and a y displacement of the contacting part relative to the measuring head base in the x and the y direction, respectively.

* * * * *